US 11,956,331 B2

(12) United States Patent
Prabhu (10) Patent No.: US 11,956,331 B2
(45) Date of Patent: Apr. 9, 2024

(54) SYSTEM AND METHOD FOR CACHE SYNCHRONIZATION AMONG NETWORK GATEWAYS IN NETWORKS SUCH AS SOFTWARE DEFINED NETWORKS

(71) Applicant: Nokia Solutions and Networks Oy, Espoo (FI)

(72) Inventor: Shailesh Prabhu, Manipal (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/930,478

(22) Filed: Sep. 8, 2022

(65) Prior Publication Data
US 2024/0089340 A1  Mar. 14, 2024

(51) Int. Cl.
*H04L 67/5682* (2022.01)
*H04L 67/5681* (2022.01)

(52) U.S. Cl.
CPC ...... *H04L 67/5682* (2022.05); *H04L 67/5681* (2022.05)

(58) Field of Classification Search
CPC .............. H04L 67/568; H04L 67/5682; H04L 67/5681; H04L 67/288; H04L 9/40; H04L 67/01; H04L 67/1001; H04L 67/10015; H04L 67/1095; H04L 67/1097
See application file for complete search history.

(56) References Cited

U.S. PATENT DOCUMENTS

| | | | | |
|---|---|---|---|---|
| 2013/0013726 A1* | 1/2013 | Westberg | ............ | H04L 67/5681 709/213 |
| 2014/0032702 A1* | 1/2014 | Ozawa | .................. | H04L 67/568 709/213 |
| 2014/0280454 A1* | 9/2014 | Medard | ................... | H04L 67/06 709/202 |
| 2018/0123833 A1* | 5/2018 | Barzik | ................. | H04N 19/433 |
| 2020/0213391 A1* | 7/2020 | Sorenson, III | ...... | G06F 11/2097 |

(Continued)

FOREIGN PATENT DOCUMENTS

EP  3151515 A1  4/2017

OTHER PUBLICATIONS

Extended European Search Report for corresponding European application No. 23191549.7; dated Dec. 21, 2023 (11 pages).

*Primary Examiner* — Johnny B Aguiar
(74) *Attorney, Agent, or Firm* — Mendelsohn Dunleavy, P.C.; Steve Mendelsohn (57) ABSTRACT

A cache management subsystem (CMS) for a network having network gateways logically organized into network gateway (NG) subsets, each NG subset comprising redundant network gateways and each network gateway comprising a local cache configured to store cache entries corresponding to information requests from network users. The subsystem includes (i) a cache manager configured to synchronize certain cache entries between the network gateways of an NG subset and (ii) a CMS cache configured to store, for the NG subset, other cache entries that are not synchronized between the network gateways of the NG subset. In certain implementations, the cache manager synchronizes within NG subsets recent cache entries having relatively frequent hits and the CMS cache stores recent cache entries having relatively infrequent hits, thereby increasing efficiencies if and when a redundant network gateway handles requests for a failed network gateway.

6 Claims, 4 Drawing Sheets

(56) References Cited

U.S. PATENT DOCUMENTS

2021/0216456 A1    7/2021  Flores et al.
2022/0224776 A1    7/2022  Doshi et al.
2022/0360627 A1*  11/2022  Vermeulen .......... H04L 67/1097

* cited by examiner

SYSTEM AND METHOD FOR CACHE SYNCHRONIZATION AMONG NETWORK GATEWAYS IN NETWORKS SUCH AS SOFTWARE DEFINED NETWORKS

BACKGROUND

Field of the Disclosure

The present disclosure relates to networks having network gateways and, more specifically but not exclusively, to techniques for managing caches in such networks.

Description of the Related Art

This section introduces aspects that may help facilitate a better understanding of the disclosure. Accordingly, the statements of this section are to be read in this light and are not to be understood as admissions about what is prior art or what is not prior art.

A network, such as a software-defined network (SDN), may have a large number of network gateways (NGs) that enable users of user equipment (UE) to download information from the network. In order to provide faster responses, conventional network gateways store, in local caches, cache information corresponding to recent information requests from users so that similar, subsequent requests from those or other users of the same network gateway can be handled faster by accessing the local cache instead of having to acquire the requested information from other nodes in the network or even nodes external to the network.

SUMMARY

In some conventional networks, pairs of network gateways may be mutually redundant, such that, if one network gateway fails, the other network gateway in that redundant pair will handle the subsequent operations of the failed network gateway. Because the second network gateway typically will not have the cache information that had been stored in the failed network gateway, the second gateway will not be able to efficiently handle subsequent information requests that were stored in the failed network gateway's cache, but not yet stored in the second network gateway's cache.

Problems in the prior art are addressed in accordance with the principles of the present disclosure by providing a cache management subsystem (CMS) that (i) logically divides the network gateways of a network into different subsets of two or more mutually redundant network gateways per subset, each subset referred to herein as an "NG subset", (ii) synchronizes local copies of certain cache information among the different network gateways in each NG subset, and (iii) stores other cache information in a CMS cache that is local to the cache management subsystem.

If and when a "first" network gateway in an NG subset fails, the "second" network gateway in that same NG subset that handles the subsequent operations of the failed, first network gateway will already have at least the synchronized cache information in its local cache. As such, the second network gateway will be able to efficiently handle a subsequent request from a user for information that is part of the synchronized cache information.

If the requested information is not yet stored in the second network gateway's local cache, then the second network gateway will send the information request to the cache management subsystem, which will determine whether the requested information is already stored in its local CMS cache. If so, then the cache management subsystem will be able to respond to the information request based on its local cache information.

If the CMS cache does not have the requested information, then and only then will the cache management subsystem forward the information request to another network node for handling.

In this way, a cache management subsystem of the present disclosure improves the efficiency with which a network handles information requests following the failure of a network gateway.

In one embodiment, the present disclosure is a cache management subsystem (CMS) for a network having a plurality of network gateways logically organized into one or more network gateway (NG) subsets, each NG subset comprising two or more redundant network gateways and each network gateway comprising a local cache configured to store cache entries corresponding to information requests from network users. The subsystem comprises (i) a cache manager configured to synchronize one or more cache entries between the network gateways of an NG subset and (ii) a CMS cache configured to store, for the NG subset, one or more cache entries that are not synchronized between the network gateways of the NG subset.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
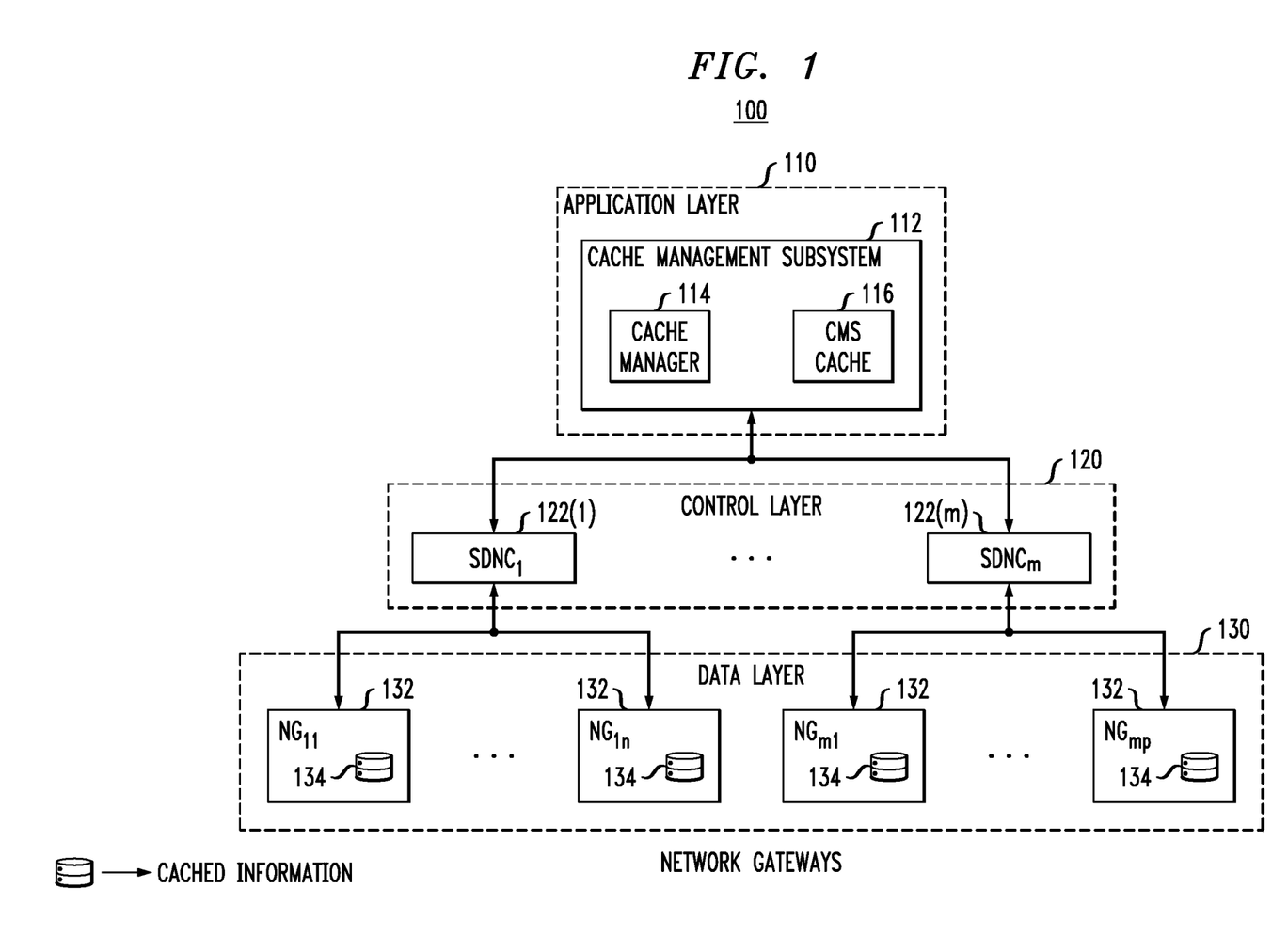
FIG. 1 is a block diagram representing at least a portion of a software-defined network (SDN) according to certain embodiments of the disclosure.

FIG. 1 is a block diagram representing at least a portion of a software-defined network (SDN) 100 according to certain embodiments of the disclosure. As shown in FIG. 1, SDN network 100 is a hierarchical network having an application layer 110, a control layer 120, and a data layer 130. The application layer 110 includes a cache management subsystem (CMS) 112 comprising a cache manager 114 and a CMS cache 116. The control layer 120 includes m SDN controllers (SDNCs) 122, where m is a positive integer. Each SDN controller 122 is responsible for handling a different group of network gateways (NGs) 132 in the data layer 130. For example, the first SDN controller 122(1) is responsible for handling n network gateways 132, and the mth SDN controller 122(m) is responsible for handling p network gateways 132, where n and p are positive integers. Each network gateway 132 has its own local cache 134 and is responsible for communicating with one or more UEs (not shown) of one or more users.

According to certain embodiments of the disclosure, the network gateways 132 associated with each SDN controller 122 are logically divided into multiple NG subsets, where each NG subset has two or more redundant network gateways 132, each of which is capable of handling the processing of any other network gateway in the same NG subset if that other network gateway fails. To make that processing efficient, the cache manager 114 (i) ensures that certain cache information is synchronized between the local caches 134 of the network gateways 132 of each NG subset and (ii) ensures that other cache information is stored in its own local CMS cache 116.

According to certain implementations, the cache manager 114 synchronizes, across the local caches 134 of the network gateways 132 of each NG subset, cache information having more hits (i.e., cache information that is more frequently requested by users over a period of time) and stores cache information having fewer hits in the CMS cache 116. As such, if and when a network gateway 132 fails, cache information for the failed network gateway's more-frequent information requests will already be stored in the local caches 134 of the other network gateways 132 in the same NG subset. Furthermore, cache information for the less-frequent information requests of the failed network gateway 132 will already be stored in the CMS cache 116. As such, when the redundant, second network gateway 132 that is now handling operations for the failed, first network gateway 132, receives an information request, the requested information may already be stored in the local cache 134 of that second network gateway 132 and, if not there, then perhaps in the CMS cache 116.

Each network gateway 132 maintains its own local cache 134 based on the information requests recently received by the network gateway 132 from its associated users. If a particular information request is not yet represented in that local cache 134, then, after acquiring the requested information, the network gateway 132 stores information associated with that information request in its local cache 134 along with a timestamp corresponding to the current time and a hit value of one. Depending on the implementation, a network gateway 132 may store in its local cache 134 either the entire information fetched from a remote (origin) location or only a subset of that information. If a particular information request is already represented in the local cache 134, then the network gateway 132 updates the timestamp to correspond to the current time and increases the hit value by one. The network gateway 132 periodically reviews its local cache 134 and deletes entries whose timestamp is older than a specified time-to-live (TTL) value. If and when the network gateway 132 receives an information request that is not represented in the local cache 134 when the local cache 134 is full, the network gateway 132 may make room for the newly requested information by deleting one or more existing entries based on their (old) timestamps and/or their (small) hit values.

Figure 2:
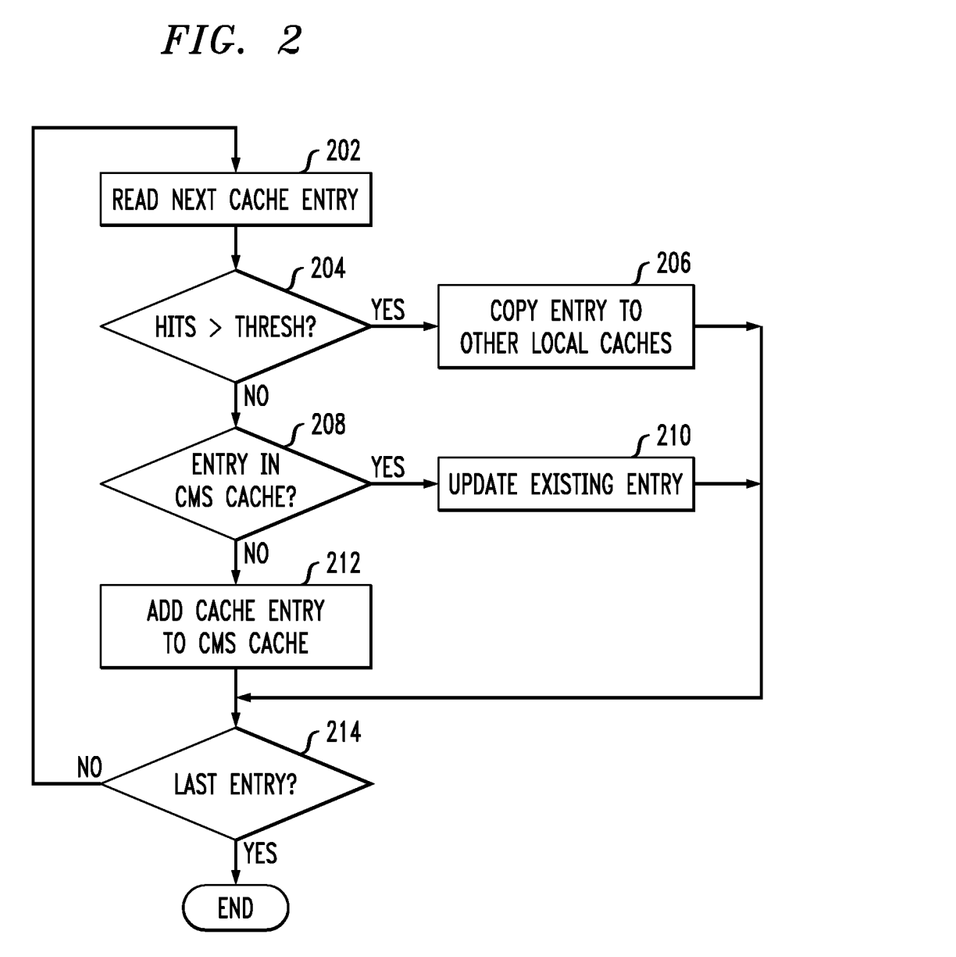
FIG. 2 is a flow diagram representing the processing periodically performed by the cache manager of FIG. 1 to synchronize the local caches of the network gateways of each NG subset and update the CMS cache of FIG. 1.

FIG. 2 is a flow diagram representing the processing periodically performed by the cache manager 114 of FIG. 1 to synchronize the local caches 134 of the network gateways 132 of each NG subset and update the CMS cache 116. The processing of FIG. 2 corresponds to the processing performed for a given network gateway 132 in a given NG subset, which processing would be implemented for each network gateway 132 of each NG subset.

In certain implementations, the cache manager 114 stores cache entries into its local CMS cache 116 in chronological order. In addition to timestamps and hit values, the cache manager 114 also stores, for each cache entry, an NG subset identifier that uniquely identifies the NG subset corresponding to the network gateway 132 for the cache entry.

In step 202, the cache manager 114 retrieves a cache entry from the local cache 134 of the network gateway 132. If, in step 204, the cache manager 114 determines that the hit value for the retrieved cache entry is greater than a specified hit threshold value, then, in step 206, the cache manager 114 ensures that the local cache 134 of each other network gateway 132 in that same NG subset has a copy of the cache information for that cache entry. If the local cache 134 in one of those other network gateways 132 already has that cache information stored, then, as part of step 206, the cache manager 114 ensures that the timestamp for that already stored cache entry is the more recent of the two timestamps and that the hit value for that already stored cache entry is the greater of the two hit values. On the other hand, if the local cache 134 in that other network gateway 132 did not previously have that cache information stored, then, as part of step 206, the cache manager 114 simply copies the cache entry into the local cache 134 with the timestamp and hit value from the other network gateway. Following step 206, processing continues to step 214.

If, in step 204, the cache manager 114 determines that the hit value for the retrieved cache entry is not greater than the specified hit threshold value, then processing proceeds to step 208 where the cache manager 114 determines whether the retrieved cache entry is already stored in its own local CMS cache 116 for that same NG subset. If the cache manager 114 determines in step 208 that the retrieved cache entry is already stored in its own local CMS cache 116 for that same NG subset so, then, in step 210, the cache manager 114 updates the timestamp to the current time and increments the hit value of that cache entry. Processing then continues to step 214.

If the cache manager 114 determines in step 208 that the retrieved cache entry is not stored in the CMS cache 116 for that same NG subset, then, in step 212, the cache manager 114 stores that cache entry in the CMS cache 116 along with the current timestamp, a hit value of one, and the corresponding NG subset identifier. Processing then continues to step 214.

In step 214, the cache manager 114 determines whether the previously retrieved cache entry is the last cache entry in the local cache 134. If not, then processing returns to step 202 to retrieve the next cache entry in the local cache 134. Otherwise, the processing of FIG. 2 ends.

In some implementations, the hit threshold value is a programmable value that may be different for different NG subsets. In some implementations, the hit threshold value may be dynamically selected based on, for example, one or more of the fullness of the local caches 134, the fullness of the CMS cache 116, and the hit values for the current cache entries. In some implementations, if a particular cache entry is about to expire (i.e., has a relatively old timestamp), then the cache manager 114 does not synchronize that cache entry among the different local caches 134 and does not store that cache entry into the CMS cache 116.

Like the network gateways 132, the cache manager 114 purges the CMS cache 116 of old cache entries whose timestamps have expired. Like the network gateways 132, the cache manager 114 may also delete old and/or infrequent cache entries if and when the CMS cache 116 gets full.

Figure 3:
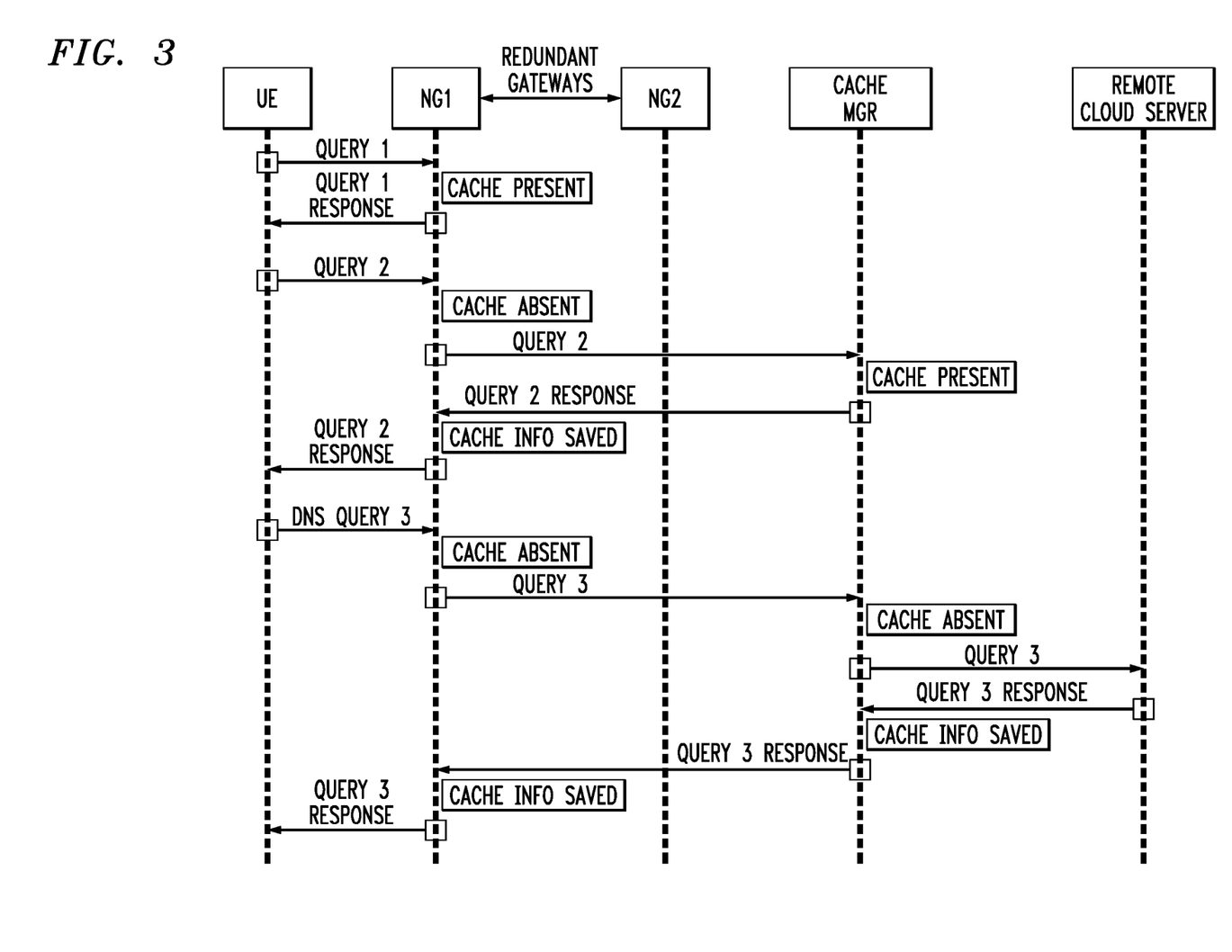
FIG. 3 is a signal flow diagram showing some possible operations in the SDN network of FIG. 1.

FIG. 3 is a signal flow diagram showing some possible operations in the SDN network 100 of FIG. 1, where time flows from top to bottom of the figure. As shown in FIG. 3, a UE transmits a first information request (Query 1) to a first network gateway (NG1). In this case, since the requested information is present in NG1's local cache, NG1 is able to provide that information (Query 1 response) to the UE without having to communicate with any other nodes in the SDN network 100.

A UE (i.e., either the same UE or a different UE that is also associated with NG1) then transmits a second information request (Query 2) to NG1. In this case, since the requested information is not present in NG1's local cache, NG1 forwards Query 2 to the cache manager 114. Since the requested information is present in the CMS cache 116, the cache manager 114 is able to provide that information (Query 2 response) to NG1, which stores the requested information in its local cache and forwards the requested information to the UE without having to communicate with any other nodes in the SDN network 100 other than the cache manager 114.

A UE then transmits a third information request (Query 3) to NG1. In this case, since the requested information is not present in NG1's local cache, NG1 forwards Query 3 to the cache manager 114. Since the requested information is also not present in the CMS cache 116, the cache manager 114 forwards Query 3 to a remote cloud server to retrieve the requested information (Query 3 response) which the cache manager 114 stores in the CMS cache 116 and forwards to NG1, which stores the requested information in its local cache and forwards the requested information to the UE.

Figure 4:
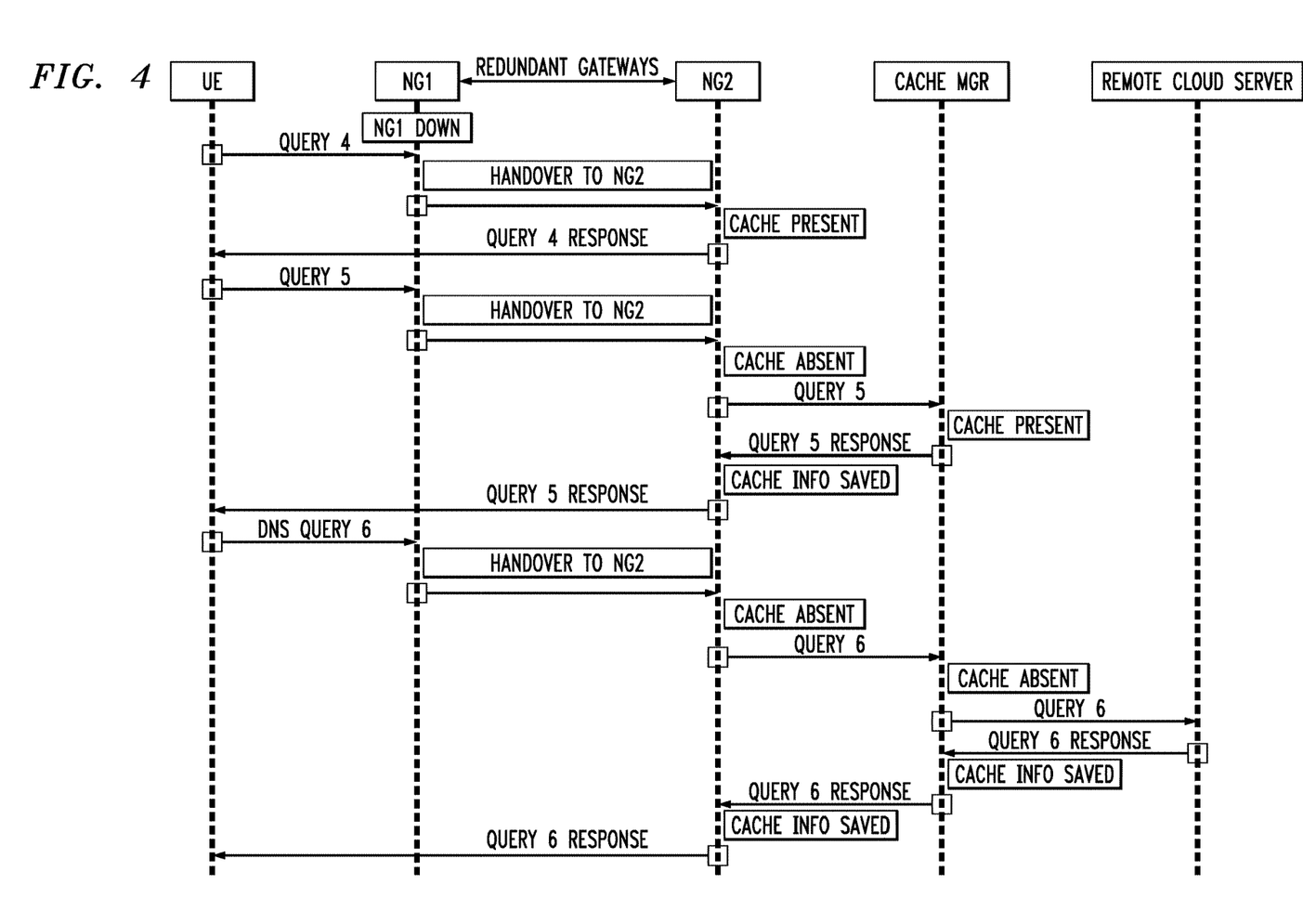
FIG. 4 is a signal flow diagram showing some additional possible operations in the SDN network of FIG. 1.

FIG. 4 is a signal flow diagram showing some additional possible operations in the SDN network 100 of FIG. 1, where time flows from top to bottom of the figure. As shown in FIG. 4, a UE transmits a fourth information request (Query 4) to NG1. In this case, NG1 had previously failed and its operations are now being handled by a second network gateway (NG2) which is in the same NG subset as NG1. As such, Query 4 is handed over to NG2. In this case, since the requested information is present in NG2's local cache, NG2 is able to provide that information (Query 4 response) to the UE without having to communicate with any other nodes in the SDN network 100.

A UE then transmits a fifth information request (Query 5) to NG1. Here, too, since NG1 is still failed, Query 5 is handed over to NG2. In this case, since the requested information is not present in NG2's local cache, NG2 forwards Query 5 to the manager 114. Since the requested information is present in the CMS cache 116, the cache manager 114 is able to provide that information (Query 5 response) to NG2, which stores the requested information in its local cache and forwards the requested information to the UE without having to communicate with any other nodes in the SDN network 100 other than the cache manager 114.

A UE then transmits a sixth information request (Query 6) to NG1. Here, too, since NG1 is still failed, Query 6 is handed over to NG2. In this case, since the requested information is not present in NG2's local cache, NG2 forwards Query 6 to the cache manager 114. Since the requested information is also not present in the CMS cache 116, the cache manager 114 forwards Query 6 to the remote cloud server to retrieve the requested information (Query 6 response) which the cache manager 114 stores in the CMS cache 116 and forwards to NG2, which stores the requested information in its local cache and forwards the requested information to the UE.

Although embodiments have been described in the context of software-defined networks in which the network gateways are implemented using SDN technology, the disclosure also includes networks having conventional hardware-based network gateways as well as networks having both SDN network gateways and hardware-based network gateways.

Those skilled in the art will understand that the term "network gateway" covers any data-layer device that enables users to access the network, including, without limitation, routers and switches.

Although embodiments have been described in the context of networks having a control layer between the application layer and the data layer, the disclosure also includes networks having an application layer and a data layer but no control layer. In such networks, the cache management subsystem communicates directly with the network gateways.

Depending on the particular implementation, different communications between different nodes of the network may be via wireless, wired, or optical links.

In certain embodiments, the present disclosure is a cache management subsystem (CMS) for a network having a plurality of network gateways logically organized into one or more network gateway (NG) subsets, each NG subset comprising two or more redundant network gateways and each network gateway comprising a local cache configured to store cache entries corresponding to information requests from network users. The subsystem comprises (i) a cache manager configured to synchronize one or more cache entries between the network gateways of an NG subset and (ii) a CMS cache configured to store, for the NG subset, one or more cache entries that are not synchronized between the network gateways of the NG subset.

In at least some of the above embodiments, a cache entry in the local cache of a network gateway identifies a number of cache hits for the cache entry, and the cache manager is configured to select a cache entry having a number of cache hits greater than a specified hit threshold in the local cache of a network gateway to be stored in the local cache of each other network gateway in the same NG subset.

In at least some of the above embodiments, the cache manager is configured to store, in the CMS cache, a cache entry having a number of cache hits less than the specified hit threshold.

In at least some of the above embodiments, the network gateways are software-defined network (SDN) gateways, and the network further comprises a control layer having one or more SDN controllers between the cache management subsystem and the plurality of network gateways.

In at least some of the above embodiments, the cache manager is configured to (i) receive an information request from a network gateway that does not have a cache entry stored in its local cache for the information request and (ii) determine whether the CMS cache has a cache entry for the information request. If the CMS cache has a cache entry for the information request, then the cache manager is configured to forward the requested information to the network gateway. If the CMS cache does not have a cache entry for the information request, then the cache manager is configured to (i) request the requested information from a remote location, (ii) receive the requested information from the remote location, (iii) forward the requested information to the network gateway, and (iv) store a cache entry for the requested information in the CMS cache.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A cache management subsystem (CMS) for a network comprising a plurality of network gateways logically organized into one or more network gateway (NG) subsets, each particular NG subset comprising two or more redundant network gateways and each redundant network gateway comprising a local cache configured to store cache entries corresponding to information requests from network users, the cache management subsystem comprising:
    a cache manager configured to synchronize one or more cache entries between particular redundant network gateways of a particular NG subset; and
    a CMS cache configured to store, for the particular NG subset, one or more cache entries that are not synchronized between the particular redundant network gateways of the particular NG subset, wherein:
        a cache entry in the local cache of a particular redundant network gateway identifies a number of cache hits for the cache entry;
        the cache manager is configured to select a first particular cache entry having a number of cache hits greater than a specified hit threshold in the local cache of the particular redundant network gateway to be stored in the local cache of each other redundant network gateway in a same particular NG subset;
        the cache manager is configured to store, in the CMS cache, a second particular cache entry having a number of cache hits less than the specified hit threshold;
        the cache manager is configured to (i) receive an information request from the particular redundant network gateway that does not have the first particular cache entry stored in the local cache of the particular redundant network gateway for the information request and (ii) determine whether the CMS cache has the first particular cache entry for the information request;
        when the CMS cache has the first particular cache entry for the information request, then the cache manager is configured to forward the requested information to the particular redundant network gateway; and
        when the CMS cache does not have the first particular cache entry for the information request, then the cache manager is configured to (i) request the requested information from a remote location, (ii) receive the requested information from the remote location, (iii) forward the requested information to the particular redundant network gateway, and (iv) store the first particular cache entry for the requested information in the CMS cache.

2. The cache management subsystem of claim 1, wherein:
    the plurality of network gateways are software-defined network (SDN) gateways; and
    the network further comprises a control layer having one or more SDN controllers between the cache management subsystem and the plurality of network gateways.

3. A method for a network comprising a plurality of network gateways logically organized into one or more network gateway (NG) subsets, each particular NG subset comprising two or more redundant network gateways and each redundant network gateway comprising a local cache configured to store cache entries corresponding to information requests from network users, the method comprising a cache manager of a cache management subsystem:
    synchronizing one or more cache entries between particular redundant network gateways of a particular NG subset; and
    storing, for the particular NG subset in a cache management subsystem (CMS) cache of the cache management subsystem, one or more cache entries that are not synchronized between the particular redundant network gateways of the particular NG subset, wherein:

a cache entry in the local cache of a particular redundant network gateway identifies a number of cache hits for the cache entry;

the cache manager selects a first particular cache entry having a number of cache hits greater than a specified hit threshold in the local cache of the particular redundant network gateway to be stored in the local cache of each other redundant network gateway in a same particular NG subset;

the cache manager stores, in the CMS cache, a second particular cache entry having a number of cache hits less than the specified hit threshold;

the cache manager (i) receives an information request from the particular redundant network gateway that does not have the first particular cache entry stored in the local cache of the particular redundant network gateway for the information request and (ii) determines whether the CMS cache has the first particular cache entry for the information request;

when the CMS cache has the first particular cache entry for the information request, then the cache manager forwards the requested information to the particular redundant network gateway; and when the CMS cache does not have the first particular cache entry for the information request, then the cache manager (i) requests the requested information from a remote location, (ii) receives the requested information from the remote location, (iii) forwards the requested information to the particular redundant network gateway, and (iv) stores the first particular cache entry for the requested information in the CMS cache.

4. The method of claim 3, wherein:
the plurality of network gateways are software-defined network (SDN) gateways; and
the network further comprises a control layer having one or more SDN controllers between the cache management subsystem and the plurality of network gateways.

5. A subsystem for a network comprising a plurality of network gateways logically organized into one or more network gateway (NG) subsets, each particular NG subset comprising two or more redundant network gateways and each redundant network gateway comprising a local memory configured to store memory entries corresponding to information requests from network users, the subsystem comprising:

a subsystem processor configured to synchronize one or more memory entries between particular redundant network gateways of a particular NG subset; and a subsystem memory configured to store, for the particular NG subset, one or more memory entries that are not synchronized between the particular redundant network gateways of the particular NG subset, wherein:

a memory entry in the local memory of a particular redundant network gateway identifies a number of memory hits for the memory entry;

the subsystem processor is configured to select a first particular memory entry having a number of memory hits greater than a specified hit threshold in the local memory of the particular redundant network gateway to be stored in the local memory of each other redundant network gateway in a same particular NG subset;

the subsystem processor is configured to store, in the subsystem memory, a second particular memory entry having a number of memory hits less than the specified hit threshold;

the subsystem processor is configured to (i) receive an information request from the particular redundant network gateway that does not have the first particular memory entry stored in the local memory of the particular redundant network gateway for the information request and (ii) determine whether the subsystem memory has the first particular memory entry for the information request;

when the subsystem memory has the first particular memory entry for the information request, then the subsystem processor is configured to forward the requested information to the particular redundant network gateway; and when the subsystem memory does not have the first particular memory entry for the information request, then the subsystem processor is configured to (i) request the requested information from a remote location, (ii) receive the requested information from the remote location, (iii) forward the requested information to the particular redundant network gateway, and (iv) store the first particular memory entry for the requested information in the subsystem memory.

6. The subsystem of claim 5, wherein:
the plurality of network gateways are software-defined network (SDN) gateways; and
the network further comprises a control layer having one or more SDN controllers between the subsystem and the plurality of network gateways.

* * * * *